US012750901B2

(12) United States Patent
Hart et al.

(10) Patent No.: US 12,750,901 B2
(45) Date of Patent: Sep. 29, 2026

(54) ALLOCATING WIRELESS RESOURCES FOR PEER-TO-PEER COMMUNICATIONS

(71) Applicant: Cisco Technology, Inc., San Jose, CA (US)

(72) Inventors: Brian D. Hart, Sunnyvale, CA (US); Malcolm M. Smith, Richardson, TX (US); Pooya Monajemi, San Jose, CA (US); Jerome Henry, Pittsboro, NC (US); Robert E. Barton, Richmond (CA); Matthew A. Silverman, Shaker Heights, OH (US)

(73) Assignee: Cisco Technology, Inc., San Jose, CA (US)

( * ) Notice: Subject to any disclaimer, the term of this patent is extended or adjusted under 35 U.S.C. 154(b) by 413 days.

(21) Appl. No.: 18/177,020

(22) Filed: Mar. 1, 2023

(65) Prior Publication Data

US 2024/0155710 A1 May 9, 2024

Related U.S. Application Data

(60) Provisional application No. 63/382,825, filed on Nov. 8, 2022.

(51) Int. Cl.

*H04W 84/12* (2009.01)
*H04L 67/104* (2022.01)
*H04W 24/08* (2009.01)
*H04W 76/14* (2018.01)

(52) U.S. Cl.

CPC ........... *H04W 76/14* (2018.02); *H04L 67/104* (2013.01); *H04W 24/08* (2013.01)

(58) Field of Classification Search

CPC ..... H04L 67/104; H04L 41/147; H04L 67/04; H04W 76/14; H04W 84/12; H04W 92/18; H04W 72/40; H04W 24/08; H04W 16/14
USPC ................ 370/252, 329, 430, 338, 245, 442
See application file for complete search history.

(56) References Cited

U.S. PATENT DOCUMENTS

| | | | | |
|---|---|---|---|---|
| 10,484,925 | B1 * | 11/2019 | Chen | H04W 40/16 |
| 10,595,185 | B1 | 3/2020 | Chen et al. | |
| 11,844,106 | B2 * | 12/2023 | Ajami | H04W 84/12 |
| 12,213,172 | B2 * | 1/2025 | Kim | H04W 72/12 |
| 2006/0165035 | A1 | 7/2006 | Chandra et al. | |
| 2007/0104138 | A1 | 5/2007 | Rudolf et al. | |
| 2008/0019324 | A1 | 1/2008 | Matsumoto et al. | |

(Continued)

OTHER PUBLICATIONS

International Search Report and Written Opinion for International Application No. PCT/US2023/077504, mailed Jan. 22, 2024, 14 Pages.

*Primary Examiner* — John Pezzlo
(74) *Attorney, Agent, or Firm* — Patterson + Sheridan, LLP

(57) ABSTRACT

Techniques for improved peer-to-peer communication are provided. A set connectivity metrics among a set of wireless devices on a plurality of wireless channels in a wireless network is collected, and a wireless channel of the plurality of wireless channels is identified, based on the set of connectivity metrics, to use for peer-to-peer communication. A request is received, from a peer-to-peer device, for peer-to-peer communications, and the wireless channel is indicated to the peer-to-peer device, where the peer-to-peer device uses the first wireless channel for peer-to-peer communications in response to the indication.

20 Claims, 6 Drawing Sheets

(56) References Cited

U.S. PATENT DOCUMENTS

| | | | | |
|---|---|---|---|---|
| 2010/0226279 | A1* | 9/2010 | Georgis | H04W 64/00 370/254 |
| 2011/0082939 | A1* | 4/2011 | Montemurro | H04W 76/14 709/227 |
| 2014/0328261 | A1* | 11/2014 | Sampath | H04L 5/0094 370/329 |
| 2015/0146633 | A1* | 5/2015 | Kalhan | H04W 4/70 370/329 |
| 2015/0172905 | A1* | 6/2015 | Qi | H04L 67/1061 370/338 |
| 2015/0351018 | A1 | 12/2015 | Kim et al. | |
| 2016/0174272 | A1* | 6/2016 | Rabii | H04W 8/005 455/422.1 |
| 2017/0105222 | A1 | 4/2017 | Nieman et al. | |
| 2017/0188241 | A1 | 6/2017 | Mueck et al. | |
| 2018/0213382 | A1* | 7/2018 | Tabet | H04W 8/005 |
| 2020/0288326 | A1 | 9/2020 | Borges et al. | |
| 2021/0204343 | A1 | 7/2021 | Jung et al. | |
| 2023/0104446 | A1* | 4/2023 | Ajami | H04W 84/12 370/329 |
| 2023/0247666 | A1* | 8/2023 | Kim | H04W 74/006 |
| 2023/0371102 | A1* | 11/2023 | Shafin | H04W 8/24 |
| 2024/0073946 | A1* | 2/2024 | Sun | H04W 72/12 |

* cited by examiner

ALLOCATING WIRELESS RESOURCES FOR PEER-TO-PEER COMMUNICATIONS

CROSS-REFERENCE TO RELATED APPLICATIONS

This application claims benefit of U.S. provisional patent application Ser. No. 63/382,825 filed Nov. 8, 2022. The aforementioned related patent application is herein incorporated by reference in its entirety.

TECHNICAL FIELD

Embodiments presented in this disclosure generally relate to peer-to-peer communications. More specifically, embodiments disclosed herein relate to delegated peer-to-peer communications using allocated resources.

BACKGROUND

In some wireless local area network (WLAN) deployments, such as WiFi systems, peer-to-peer (P2P) or client-to-client (C2C) mechanisms can be used to enable direct communication between devices. This can more generally be viewed as a network allowing one or more other devices to directly communicate with each other without requiring uplink/downlink from the network (e.g., without transmitting data to or receiving data from a wireless access point (AP) that provides the WLAN connectivity). In some systems, peer-to-peer support is limited to APs allocating time slots (e.g., TXOPs) and/or resource units (RUs) for peer-to-peer stations (STAs), such as within a multiuser (MU) trigger-based physical layer protocol data unit (TB-PPDU).

Conventional approaches to peer-to-peer scheduling are generally inefficient and do not scale well, particularly when a large number of peer-to-peer devices are present and/or a large amount of peer-to-peer communication occurs.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate typical embodiments and are therefore not to be considered limiting; other equally effective embodiments are contemplated.

To facilitate understanding, identical reference numerals have been used, where possible, to designate identical elements that are common to the figures. It is contemplated that elements disclosed in one embodiment may be beneficially used in other embodiments without specific recitation.

DESCRIPTION OF EXAMPLE EMBODIMENTS

Overview

Figure 1:
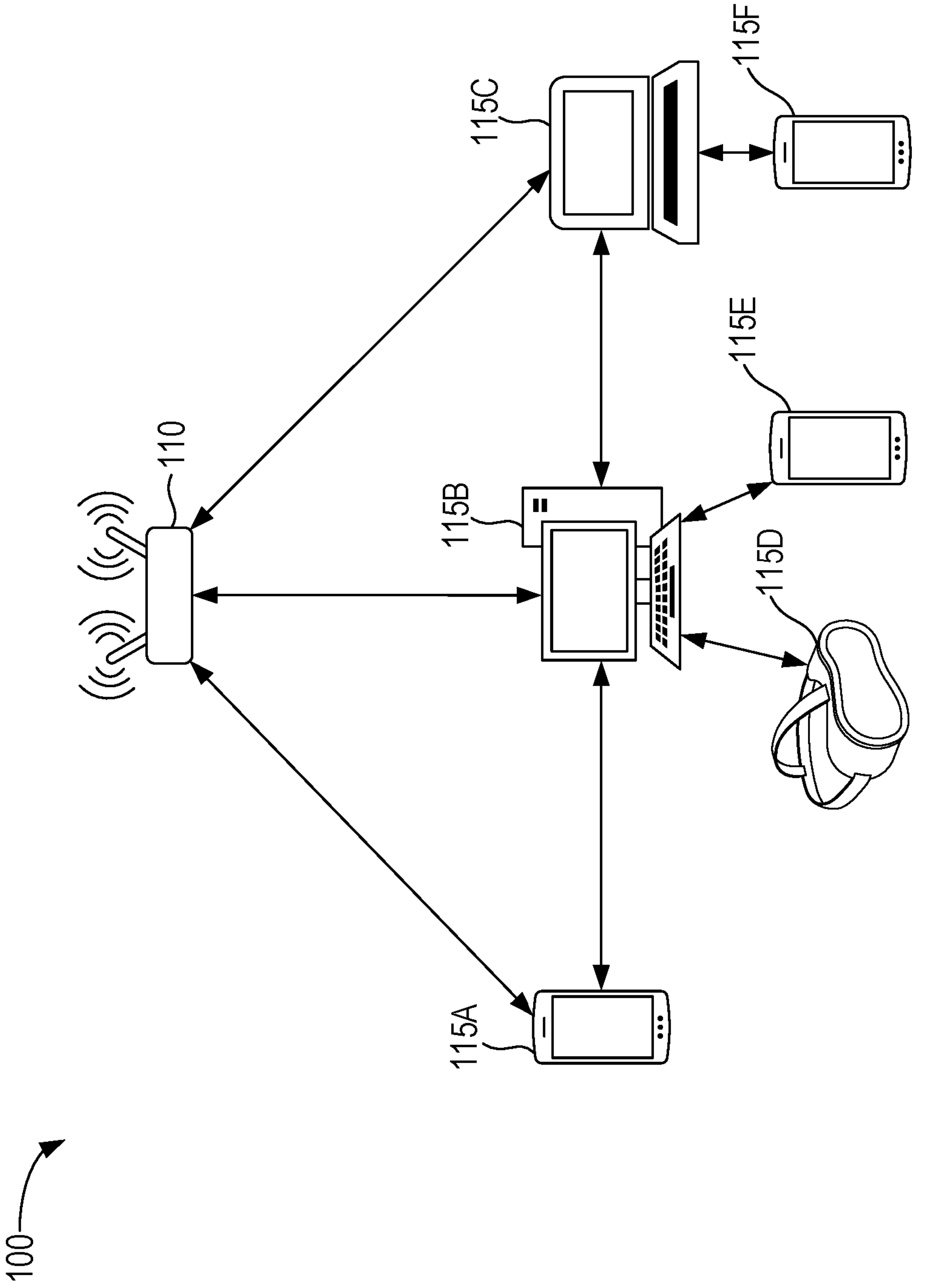
FIG. 1 depicts an example environment for allocation of resources for peer-to-peer communication, according to some embodiments of the present disclosure.

One embodiment presented in this disclosure provides a method, including collecting a set connectivity metrics among a set of wireless devices on a plurality of wireless channels in a wireless network; identifying, by a wireless access point (AP), a first wireless channel, of the plurality of wireless channels, to use for peer-to-peer communication based on the set of connectivity metrics; receiving a request, from a peer-to-peer device, for peer-to-peer communications; and indicating the first wireless channel to the peer-to-peer device, wherein the peer-to-peer device uses the first wireless channel for peer-to-peer communications in response to the indication.

Other embodiments in this disclosure provide non-transitory computer-readable mediums containing computer program code that, when executed by operation of one or more computer processors, performs operations in accordance with one or more of the above methods, as well as systems comprising one or more computer processors and one or more memories containing one or more programs which, when executed by the one or more computer processors, performs an operation in accordance with one or more of the above methods.

Example Embodiments

Embodiments of the present disclosure provide methods, systems, and techniques for improved peer-to-peer communications via resource allocation.

In some embodiments, rather than allowing APs to orchestrate channel usage for peer-to-peer communications (e.g., by allocating time slots for peer-to-peer use), one or more APs may instead coordinate and agree to allocate a subset of the radio frequency (RF) spectrum (e.g., one or more channels) specifically for peer-to-peer traffic so as to minimize interference with the WLAN traffic (e.g., data transmitted to and from the AP(s) from client devices), which may include mission critical infrastructure traffic.

In some embodiments, the WLAN system can use one or more techniques, such as Radio Resource Management (RRM), to scan the available spectrum and choose portions of the spectrum (e.g., one or more channels) that is or are suitable or preferable for peer-to-peer use (e.g., for devices to use for peer-to-peer communication) as opposed to AP usage (e.g., for APs to use to transmit or receive data from devices).

In some embodiments, the criteria for connectivity between client devices and APs may be relaxed in order to select channel(s) for peer-to-peer use, as the target connectivity matrix is unknown when the channel is assigned. That is, though an AP may seek to find channels with some minimum connectivity/quality between itself and the client(s), channels that will be used for peer-to-peer use may be subject to relaxed or reduced requirements. For example, using coverage hole detection, APs can seek to identify areas in the WLAN with weak or non-existent signal, and configure channel usage to account for these holes.

However, for peer-to-peer use, and particularly for peer-to-peer communications between a first device that acts as a proxy or soft AP for a subtended device, the planned or existing proxy/companion connectivity matrix may be used as a lower bound on RRM channel selection thresholds, with the assumption that such peer-to-peer devices are "close" to each other. For example, when selecting channels that are suitable for peer-to-peer use (even if they are unsuitable for AP use), the AP may use additional and/or smaller peer-to-peer transmission power and/or received signal strength indicator (RSSI) target parameters. That is, the AP may determine that a given channel is suitable for peer-to-peer use because it is predicted to satisfy the (relatively lower) power and RSSI target parameters, as compared to such parameters for AP usage.

In some embodiments, the WLAN system may use feedback from the peer-to-peer device(s) themselves, such as RSSI information (e.g., in a beacon report), in order to identify a suitable channel for peer-to-peer communications. For example, the AP may seek to find a channel that has little or no perceived signal or noise, from the perspective of the peer-to-peer devices, based on the provided beacon report(s).

In some embodiments, the WLAN system can select one or more channels that are predicted to be suitable or appropriate for peer-to-peer use by using the current channel connectivity for the AP and applying appropriate frequency offset adjustment(s) for a target channel, allowing the AP to predict the peer-to-peer coverage or connectivity of the target channel(s).

In some embodiments, once the channel(s) are selected for peer-to-peer use, the AP(s) can use a variety of techniques to advertise or indicate them to peer-to-peer devices. For example, in some embodiments, the AP(s) can use an 802.11v Channel Usage element for advertisement purposes (e.g., indicating that the selected channel(s) have been delegated or allocated for peer-to-peer use), suggesting or instructing that the peer-to-peer device(s) perform their peer-to-peer communications on the specified channel(s). In some embodiments, the 802.11v message can be augmented to include or indicate specific available APs that are capable of supporting peer-to-peer communications (e.g., that respect the allocation of the channel(s) for peer-to-peer use).

In some embodiments, the peer-to-peer devices are dynamically clustered into coverage areas (e.g., by an AP). Groups of peer-to-peer devices that are all in one area or region may be deemed a cluster, and, in some embodiments, a spectrum hole can be created for that cluster to operate on a channel. That is, an AP may identify a cluster of peer-to-peer devices, and intentionally create a spectrum hole for the cluster (e.g., by refraining from using one or more channel(s) in that region, allowing the peer-to-peer group to use these channel(s)).

In some embodiments, this approach further uses one or more feedback operations (e.g., indications of latency and/or throughput requirements for the peer-to-peer devices) to the WLAN, which can ensure that clusters are not oversubscribed. In some embodiments, the AP(s) can cluster peer-to-peer devices based on a variety of data, such as the RSSI of each peer-to-peer device. In at least one embodiment, the AP(s) can use techniques such as fine timing measurements (FTM) and/or antenna array analysis for rough directionality (e.g., to determine the sector where the peer-to-peer devices are located). The AP can thereby choose a channel to serve the known peer-to-peer devices in a cluster or cell/sector.

In some embodiments, the peer-to-peer devices themselves find or select a channel to begin peer-to-peer communication. For example, in some embodiments, the peer-to-peer devices may scan and select a channel based on information such as neighbor beacons, channel utilization, and the like. In one such embodiment, the peer-to-peer device may be incentivized to share that channel information and/or neighbor list with the WLAN in order to avoid the network moving a nearby AP onto the selected channel. For example, the peer-to-peer device(s) may indicate, to the AP(s)/WLAN, that they are using (or would like to use) the specific channel for peer-to-peer communications (effectively requesting that the WLAN avoid using the indicated channel). In some embodiments, the peer-to-peer device(s) may request the channel for some period of time (e.g., the next minute), and the WLAN/APs can return some form of agreement (e.g., rejecting the request, accept for N minutes, accept with caveats, and the like).

In some embodiments, once the channel(s) have been allocated or selected for peer-to-peer communications, the peer-to-peer devices may undertake various forms of peer-to-peer group scheduling among themselves on the allocated peer-to-peer channel(s) in order to actually perform peer-to-peer communications.

FIG. 1 depicts an example environment 100 for allocation of resources for peer-to-peer communication, according to some embodiments of the present disclosure.

In the illustrated example, a wireless AP 110 is communicatively coupled with a set of peer-to-peer devices 115A-C. The wireless AP 110 is generally representative of an infrastructure network, such as a WLAN. Though a single AP 110 is depicted for conceptual clarity, in embodiments, there may be any number of APs 110. Generally, the AP(s) 110 are used to provide wireless communication via the WLAN. For example, each AP 110 may receive traffic requests from associated devices (e.g., indicating the amount of data to be transmitted, the priority of the flow, and the like). The AP 110 may then allocate available network resources to associated devices, such as by scheduling transmissions into defined timeslots and/or portions of the spectrum. For example, within each transmission opportunity (TXOP), the AP 110 may assign RU(s) or physical layer protocol data units (PPDUs) to one or more connected devices, where each connected device uses the scheduled resources to transmit data to the AP 110 (or to receive data from the AP 110).

Generally, the scheduled transmissions managed by the AP 110 can include uplink transmissions (e.g., data transmitted from one or more connected devices to the AP 110) and downlink transmissions (e.g., data transmitted from the AP 110 to one or more connected devices). In the illustrated example, the AP 110 may delegate the scheduling/management of peer-to-peer transmissions (which are transmitted and received directly between peer-to-peer devices 115) to the peer-to-peer devices themselves. That is, while the AP 110 may manage/schedule uplink and/or downlink transmissions between itself and the peer-to-peer devices 115A-C (e.g., to enable the peer-to-peer devices 115 to communicate with each other via the WLAN, or to communicate with other devices and systems on the WLAN or beyond the WLAN, such as via the Internet), the AP 110 may refrain from such active scheduling of peer-to-peer communications, delegating or allocating this peer-to-peer scheduling to the devices themselves (or to another device).

In the illustrated example, a variety of peer-to-peer devices 115 are present. Some of these devices (e.g., peer-to-peer devices 115A, 115B, and 115C) are communicatively coupled/associated to the AP 110. Some (e.g., peer-to-peer devices 115D, 115E, and 115F) do not have this direct connection. For example, as illustrated, the peer-to-peer device 1158 may act as a proxy, companion, or soft AP for the peer-to-peer devices 115D and 115E. Similarly, the peer-to-peer device 115C acts as a proxy or soft AP for the peer-to-peer device 115F. In some aspects, the peer-to-peer devices 115D, 115E, and 115F may be referred to as "subtended" devices, as discussed above. In this way, the peer-to-peer devices 115D and 115E may access the WLAN indirectly via the peer-to-peer device 115B, and the peer-to-peer device 115F may similarly access the WLAN indirectly via the peer-to-peer device 115C.

In some embodiments, the subtended peer-to-peer devices 115D, 115E, and 115F may rely on their proxies to provide transmission scheduling, connectivity, and the like. Although not included in the illustrated example, in some embodiments, the subtended devices may include communication links to one or more other peer-to-peer devices. For example, the peer-to-peer device 115D may be able to communicate directly with the peer-to-peer device 115E. In other embodiments, the subtended devices may use their proxies for all communications. For example, the peer-to-peer device 115D may transmit data to the peer-to-peer device 115E via the peer-to-peer device 115B (e.g., where the peer-to-peer device 1158 acts as a soft AP).

In the illustrated example, the peer-to-peer devices 115 higher in the hierarchy (e.g., peer-to-peer devices 115A, 115B, and 115C) may communicate directly with each other. Though not included in the illustrated example, in some embodiments, some or all of the subtended peer-to-peer devices 115D-F may additionally include one or more links to the AP 110. That is, one or more of the subtended devices may actually be associated directly to the WLAN, in addition to supporting peer-to-peer communications via their proxy.

In the illustrated environment 100, the AP 110 may determine, select, or identify one or more portion(s) of the RF spectrum to be allocated for peer-to-peer use. That is, portion(s) of the spectrum (e.g., one or more channels) may be allocated or reserved for peer-to-peer use (e.g., for peer-to-peer communications among peer-to-peer devices 115), as opposed to conventional WLAN use (e.g., for communications to and/or from the AP 110).

In some embodiments, the AP 110 selects one or more channels, independently of other devices (e.g., without seeking agreement from other APs in the WLAN). For example, the AP 110 may determine to allocate one or more channels for peer-to-peer use, instructing or suggesting that peer-to-peer devices 115 in the vicinity of the AP 110 (e.g., associated to it or within a defined distance from it) use the indicated channel(s) if they need peer-to-peer communication. In one such embodiment, other APs may similarly select one or more channel(s), which may differ from those selected by the AP 110.

In some embodiments, the AP 110 may select the peer-to-peer resources in coordination with one or more other devices or systems, such as one or more other APs in the WLAN, in conjunction with the WLAN controller, and the like. For example, the APs may jointly select one or more channels to be used for peer-to-peer communications throughout the coverage area of the network.

In embodiments, the AP 110 may select the peer-to-peer resources using a variety of techniques and criteria. For example, the AP 110 may periodically scan one or more channels in the spectrum (e.g., periodically scanning all channels in turn) to collect/evaluate connectivity metrics for each (e.g., noise, interference, signal strength, channel utilization, and the like) for each channel. Such metrics may enable the AP 110 to identify one or more channels that are well-suited for peer-to-peer communications. For example, the AP 110 may select channel(s) that are unused by the AP 110 and/or have low channel utilization, channel(s) that have low noise/interference, channel(s) with high signal strengths (indicating good RF propagation in the environment), and the like. In some embodiments, the AP 110 may receive or request similar information from neighboring APs.

In some embodiments, in addition to or instead of determining that the channel(s) are suitable for peer-to-peer communication, the AP 110 may determine that the channel(s) are not well-suited for AP use. For example, the AP 110 may identify a channel that has relatively high noise from the perspective of the AP 110. Although this noise may make the channel sub-optimal for transmissions to and from the AP 110, it may nevertheless be a good channel for peer-to-peer use (e.g., due to the relatively proximity of peer-to-peer devices among each other, which may result in reduced noise to such peer-to-peer transmissions).

In some embodiments, the AP 110 may additionally or alternatively consider other data, such as via beacon reports from associated devices (e.g., from the peer-to-peer devices 115A-C). For example, the AP 110 may request and/or receive beacon reports from associated devices, where each beacon report includes information such as the detected signals (e.g., probes or broadcasts from one or more APs) and/or signal strengths on one or more channels, perceived noise or interference on the one or more channels, and the like. Using such information, in an embodiment, the AP 110 may be able to select a channel for peer-to-peer usage that has high quality connectivity metrics.

In some embodiments, to select the peer-to-peer channel(s), the AP 110 may use one or more frequency offset or adjustment techniques to predict the connectivity metrics at the peer-to-peer channel without actually measuring or evaluating the channel directly. For example, the AP 110 may use one or more equations or models for radio propagation. As one example, a model may be used that predicts or indicates path loss based on carrier frequency. In one such embodiment, given a known path loss (e.g., RSSI) at a first frequency (e.g., for a first channel), the AP 110 may predict or infer the path loss (e.g., resulting signal strength) at a second frequency (e.g., for a second channel), which may be within the same band (e.g., within the 2.4 GHz band) or in a different band (e.g., predicting the quality of a channel in the 5 GHz band based on metrics in the 2.4 GHz band).

In some embodiments, the AP 110 may additionally or alternatively identify (or generate) a cluster or group of peer-to-peer devices 115, and proactively generate or create a spectrum hole for peer-to-peer communications. In one such embodiment, the AP 110 may identify a set of peer-to-peer devices 115 in an area (e.g., in the coverage area of the AP 110, or within a more granular region). For example, the AP 110 may use RSSI information, FTM techniques, and the like to identify peer-to-peer devices 115 within a defined proximity or distance to each other. In some embodiments, the AP 110 may additionally or alternatively identify or create the group based on other information, such as determining that the set of peer-to-peer devices 115 are engaged in (or wish to engage in) peer-to-peer communications (e.g., based on signaling from one or more of the peer-to-peer devices). In an embodiment, the AP 110 may select one or more channels to serve the cluster of peer-to-peer devices 115 based on this grouping and/or location of the group.

In some embodiments, if the AP 110 allocates wireless resources for groups of peer-to-peer devices 115, the AP 110 may monitor connectivity/communication metrics for the group to ensure the group/resources do not become oversubscribed. For example, one or more of the peer-to-peer device(s) 115 in the cluster may provide feedback related to latency and/or throughput requirements (e.g., desired metrics) and/or experience (e.g., the actual metrics for the currently allocated channel). If the AP 110 determines, based on such metrics, that the cluster is oversubscribed (e.g., the allocated channel(s) are insufficient to serve the cluster), the AP 110 may select and allocate additional resources (e.g., one or more additional channels) to the cluster.

In some embodiments, in addition to or instead of the AP 110 selecting a channel for allocation, peer-to-peer devices 115 may request one or more specific resources (e.g., channels) for some period of time. For example, a peer-to-peer device 115 may determine that a specific channel would be well-suited for peer-to-peer use (e.g., based on low utilization, low noise, and the like). In response, the peer-to-peer device 115 may transmit a request to the AP(s) 110 in the WLAN indicating the identified channel(s), and requesting that the APs 110 refrain from using them and/or allocate them to peer-to-peer communication. In some embodiments, such a request can include a specified duration (e.g., for five minutes).

In response, the AP(s) 110 may take various steps, including accepting the request (e.g., refraining from using the indicated channel(s) for the indicated duration), rejecting the request, proposing/negotiating alternatives (e.g., different channel(s) and/or different duration), and the like.

In these ways, the AP 110 can allocate resources for peer-to-peer communication without actively managing the peer-to-peer communications or devices themselves, allowing the peer-to-peer devices 115 to independently perform peer-to-peer communications without interfering with the WLAN (e.g., independently from the AP 110 managing communications on the WLAN). This can improve the efficiency of the scheduling and peer-to-peer communications, as well as reducing computational burden on the WLAN components (e.g., the AP 110), reducing the potential for interference to WLAN-connected devices, and generally improving the operations of the WLAN and the peer-to-peer devices 115.

Figure 2:
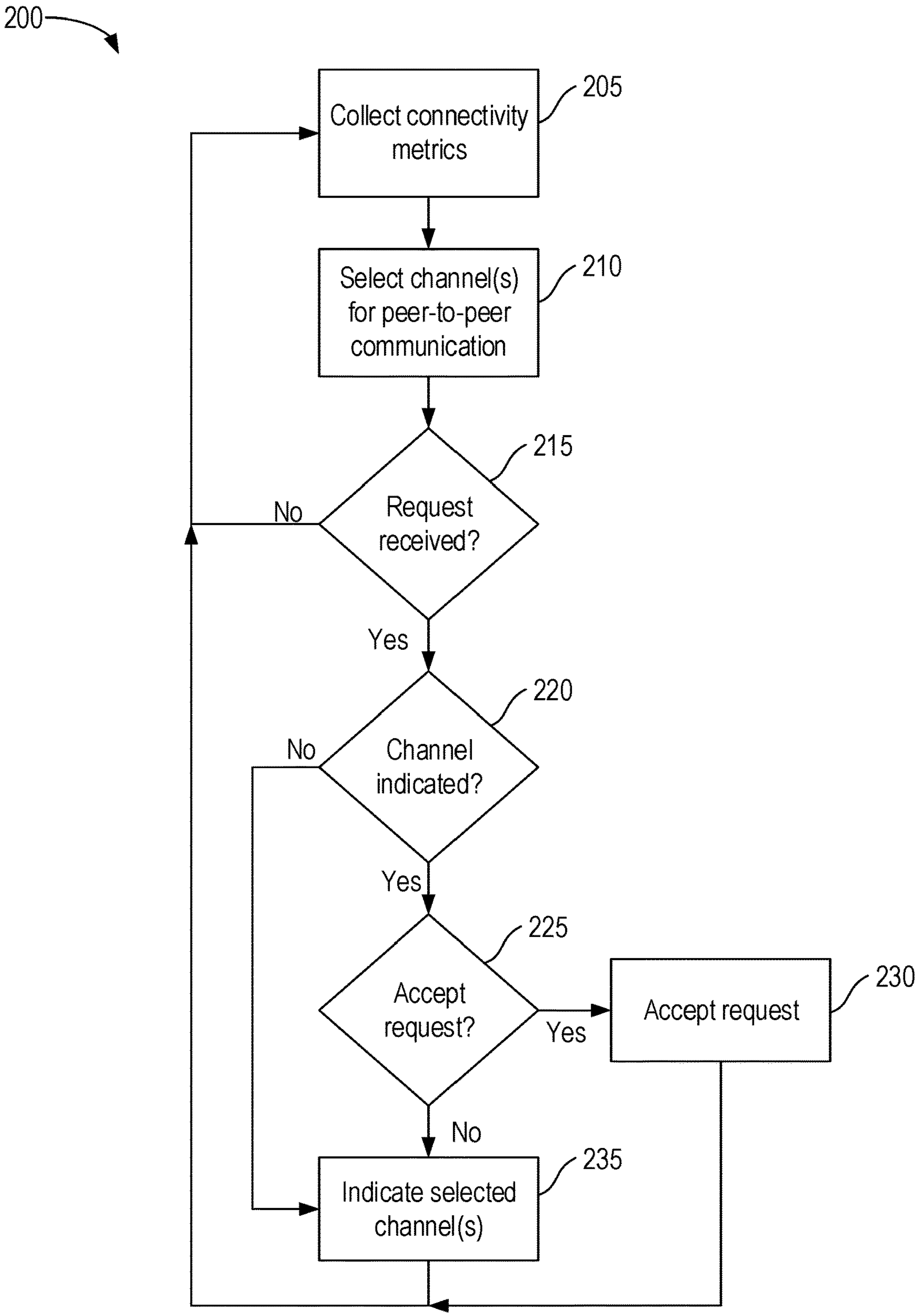
FIG. 2 is a flow diagram depicting an example method for facilitating peer-to-peer communication using allocated resources, according to some embodiments of the present disclosure.

FIG. 2 is a flow diagram depicting an example method 200 for facilitating peer-to-peer communication using allocated resources, according to some embodiments of the present disclosure. In some aspects, the method 200 is performed by a component of a WLAN, such as an AP (e.g., AP 110 of FIG. 1), a wireless controller (e.g., a WLC), and the like.

At block 205, the AP collects connectivity metrics for one or more wireless channels (e.g., one or more frequencies or subcarriers) in the environment. Generally, the metrics can include a variety of data related to the quality of the RF medium at each frequency, such as the RSSI, noise level, interference, utilization, and the like. For example, the AP may scan each channel in the 2.4 GHz band to determine corresponding connectivity metrics for each.

In some embodiments, in addition to or instead of scanning each channel, the AP can collect the connectivity metrics using various other techniques, such as via beacon reports from connected devices, via queries transmitted to neighboring AP(s), via frequency offset adjustments to known metrics, and the like.

At block 210, the AP selects one or more channels to designate or allocate for peer-to-peer communication. As discussed above, the AP may select these channel(s) using a variety of techniques and criteria. For example, the AP may select a channel that is not currently used any the AP and/or by neighboring AP(s). In some embodiments, the AP may select a channel that has metrics meeting one or more criteria, such as sufficiently low noise or interference. In at least one embodiment, the AP may select the channel(s) using relatively more relaxed criteria, as compared to when the AP selects a channel for its own use. For example, if the AP uses a first threshold level of noise or interference to determine whether a given channel is suitable for its own use (e.g., for uplink or downlink to and from the AP), the AP may use a second relatively lower threshold for determining whether a given channel is suitable for peer-to-peer use (with the assumption that peers are relatively closer together in most deployments).

In at least one embodiment, the AP selects the channel based on determining that it satisfies one or more peer-to-peer criteria (e.g., satisfying thresholds indicating the channel is suitable for peer-to-peer use) while failing to satisfy one or more AP criteria (e.g., failing to satisfy thresholds indicating the channel is suitable for AP use). That is, the AP may select a channel that is considered insufficient for AP use (e.g., too noisy), and allocate it for peer-to-peer use.

Generally, by selecting the channel(s) at block 210, the AP is determining to refrain from using the selected channels for at least some period of time (e.g., until the next time the AP scans the channels to evaluate connectivity metrics). That is, the AP is determining to allocate the channel(s) to peer-to-peer use, rather than retaining them for AP/WLAN use. Although the illustrated example depicts a single AP selecting the channels, in some embodiments, the AP(s) may coordinate their selection of peer-to-peer channels, as discussed above.

At block 215, the AP determines whether a request for peer-to-peer communications has been received (e.g., from a peer-to-peer device). In some embodiments, this request may include a request to transmit data via a peer-to-peer link (e.g., a request for a transmission opportunity or airtime for the peer-to-peer communication). In some embodiments, this request may include a request to indicate which resources (e.g., channels), if any, are designated for peer-to-peer use. In some embodiments, the request corresponds to a channel usage request (e.g., and 802.11v frame), where a non-AP device requests channel usage information (with or without associating to the WLAN) to determine the usage (if any) of each channel.

Though the illustrated example depicts receiving a request for peer-to-peer communication, in some embodiments, the AP can additionally or alternatively advertise the peer-to-peer allocations (e.g., in beacon frames) without waiting for such requests.

If, at block 215, the AP determines that no request has been received, the method 200 returns to block 205. In this way, the AP can continue to evaluate the RF medium to select peer-to-peer channels. In some embodiments, the iterative evaluation is performed according to various criteria, such as periodically (e.g., every five minutes), upon occurrence of other events (e.g., connectivity metrics on a given channel changing substantially, or the AP determining to migrate to a different channel), and the like.

If, at block 215, the AP determines that a request has been received, the method 200 continues to block 220, where the AP determines whether the request indicates a specific channel. That is, the AP can determine whether the request is a generic or agnostic request (e.g., requesting whether any peer-to-peer resources/channels are available or have been allocated, and what these channels are), or a specific request (e.g., requesting whether the device can use a specific/indicated channel for peer-to-peer communication).

If the AP determines that the request does not indicate a specific channel, the method 200 continues to block 235, where the AP indicates the channel(s) it selected in block 210. The method 200 then returns to block 205. If, at block 220, the AP determines that the request does indicate one or more specific channels, the method 200 continues to block 225.

At block 225, the AP determines whether to accept the request. In some embodiments, the AP may determine whether to accept the request based on connectivity metrics for the indicated channel, as discussed above. For example, the AP may determine whether it and/or one or more neighbor APs are using the channel (or plan to use the channel), what the noise and interference metrics are for the channel, and the like. In some embodiments, if the request further includes a requested duration, the AP can consider whether to accept based at least in part on this duration. For example, the AP may compare the duration to one or more thresholds, which may be static or may be dynamic (e.g., based on current utilization or traffic on the WLAN).

If, at block 225, the AP determines to decline the request (e.g., because the requested channel is needed or used by the WLAN, and/or the duration is too long), the method 200 continues to block 235, where the AP denies the request and indicates the channels that it selected in block 210. The method 20 then returns to block 205. If, at block 225, the AP determines to accept the request, the method 200 continues to block 230, where the AP indicates its acceptance and refrains from using the indicated channel(s) for the indicated duration. The method 200 then returns to block 205.

In this way, the AP can allocate resources for peer-to-peer communication based on a variety of metrics, thereby enabling improved peer-to-peer communication, reducing interference with the WLAN, and reducing the computational burden on the AP itself (e.g., by refraining from actively managing the peer-to-peer communications themselves).

Figure 3:
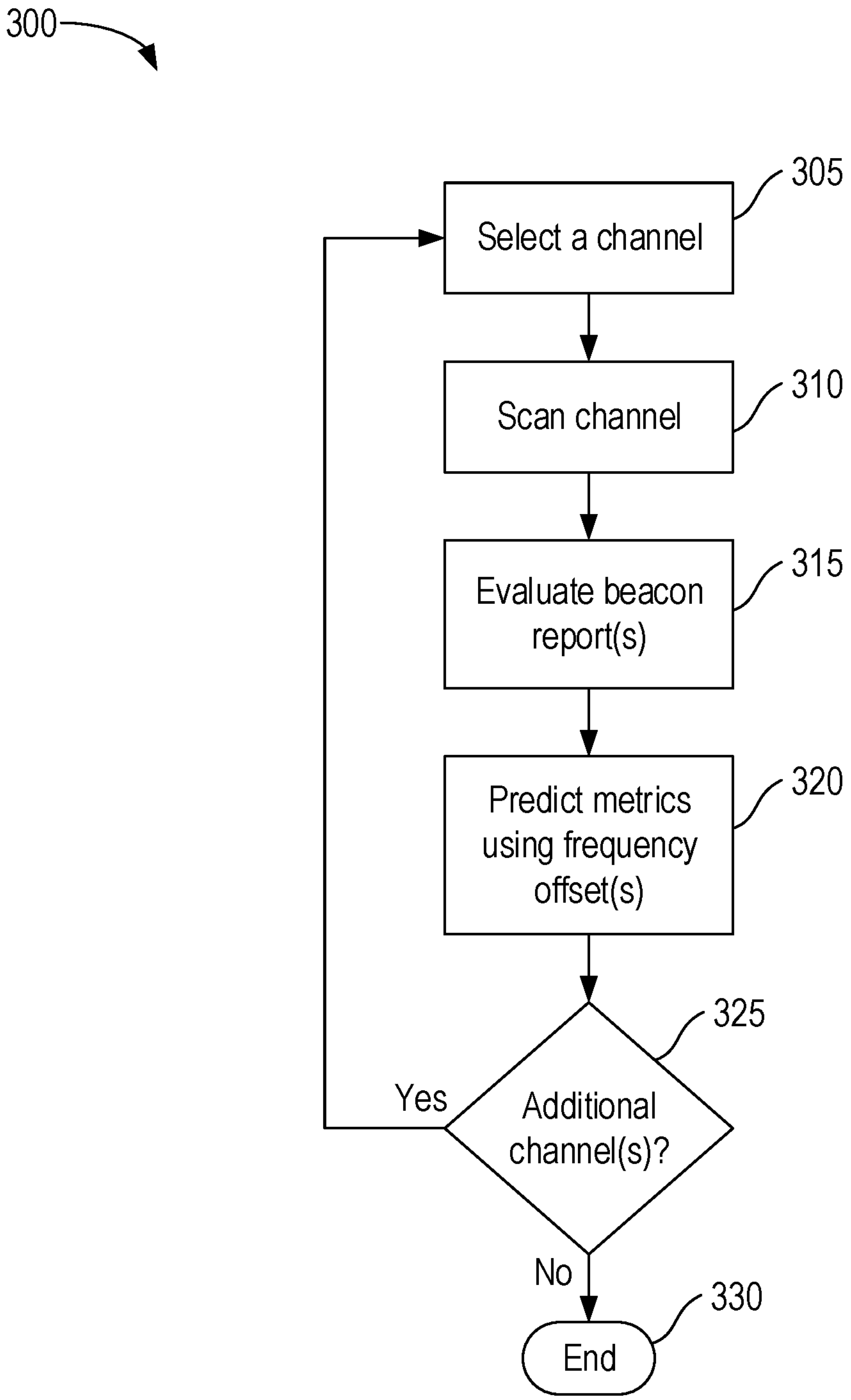
FIG. 3 is a flow diagram depicting an example method for collecting connectivity metrics to allocate resources for peer-to-peer communication, according to some embodiments of the present disclosure.

FIG. 3 is a flow diagram depicting an example method 300 for collecting connectivity metrics to allocate resources for peer-to-peer communication, according to some embodiments of the present disclosure. In some embodiments, the method 300 provides additional detail for block 210 of FIG. 2. In some aspects, the method 300 is performed by a component of a WLAN, such as an AP (e.g., AP 110 of FIG. 1), a wireless controller (e.g., a WLC), and the like.

Generally, each block of the method 300 may correspond to an optional technique to collect connectivity metrics. That is, each of the blocks may be used alternatively (e.g., independently) or in conjunction with one or more other blocks in order to generate or evaluate connectivity metrics for an environment.

At block 305, the AP selects a channel for evaluation. Generally, the AP may select the channel using any suitable criteria or technique (including randomly or pseudo-randomly). Though the illustrated example depicts sequentially selecting and evaluating each channel in turn, in some embodiments, the AP may select/evaluate some or all of the channels in parallel.

At block 310, the AP optionally scans the selected channel to determine connectivity metrics for the channel (e.g., RSSI, noise, interference, utilization, and the like). At block 315, the AP can optionally evaluate beacon reports indicating the selected channel (e.g., indicating the RSSI of any beacons or probes that connected devices received on the selected channel).

At block 320, the AP optionally predicts the metrics at one or more channels based on the metrics at the selected channel (or predicts the metrics for the selected channel based on metrics from one or more other channels were such metrics are available). That is, as discussed above, the AP may use one or more frequency offset techniques to predict the metrics at the channel. For example, the AP may use a path loss model to predict path loss on a given channel based on a determined path loss on another channel.

Though the illustrated example depicts the AP optionally using frequency offset operations, in some embodiments, the AP may never use such frequency offset predictions, depending on the particular implementation. In some embodiments, the AP always uses such techniques when estimating or predicting connectivity metrics. Additionally, in some embodiments, the AP may selectively use frequency offset techniques to predict the connectivity metrics.

For example, in some embodiments, the AP may apply frequency offset prediction techniques only if the respective bands of the two channels differ (e.g., when the measurements are collected for a channel in the 2.4 GHz band, and selected/potential peer-to-peer channel is in the 5 GHz band). In some embodiments, as a channel is a range/set of frequencies rather than a single frequency, the offset predictions can be used for multiple frequencies (e.g., two frequencies within each band, such as the middle frequencies, lower/outer frequencies, upper/inner frequencies, and the like).

In some embodiments, the AP selectively uses frequency offset prediction techniques if the respective frequencies differ by more than a defined frequency difference or ratio. For example, the AP may determine whether to use such prediction techniques based on determining whether $$10 * \log\left(\frac{f_1}{f_2}\right)$$

is greater than 2 dB or less than −2 dB, where $f_1$ and $f_2$ are the first and second frequencies, respectively. If so, the AP may determine to use frequency offset techniques to better predict the metrics at $f_2$.

At block 325, the AP determines whether there is at least one additional channel remaining to be evaluated. If so, the method 300 returns to block 305. If not, the method 300 terminates at block 330.

Figure 4:
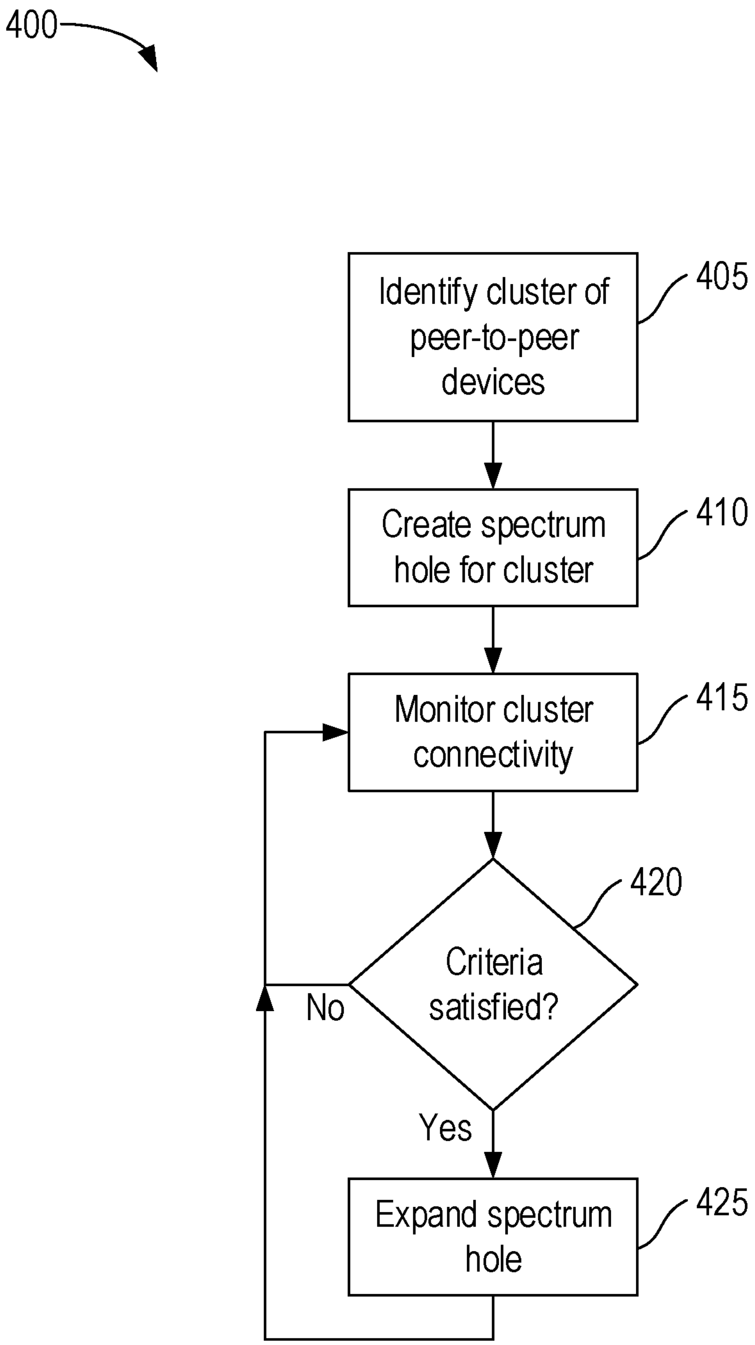
FIG. 4 is a flow diagram depicting an example method for allocating resources for clusters of peer-to-peer devices, according to some embodiments of the present disclosure.

FIG. 4 is a flow diagram depicting an example method 400 for allocating resources for clusters of peer-to-peer devices, according to some embodiments of the present disclosure. In some aspects, the method 400 is performed by a component of a WLAN, such as an AP (e.g., AP 110 of FIG. 1), a wireless controller (e.g., a WLC), and the like.

At block 405, the AP identifies (or creates) a cluster of peer-to-peer devices. For example, as discussed above, the AP may detect a group of peer-to-peer devices within a defined area and/or within a defined distance from each other (e.g., using RSSI, FTM, angle of arrival and/or angle of departure measurements, and the like).

At block 410, the AP can create a spectrum hole for the cluster. That is, the AP can determine to allocate one or more portions of the spectrum (e.g., one or more channels) to the cluster, such as by refraining from using the allocated channels entirely, refraining from using the allocated channels when communicating with devices in or near the identified physical area, instructing or requesting that other AP(s) refrain from using the channels entirely and/or within the area, and the like.

At block 415, the AP monitors cluster connectivity. For example, as discussed above, the AP may monitor the current throughput, latency, utilization, and the like of the allocated channels in the cluster. At block 420, the AP determines whether one or more criteria are satisfied based on the connectivity metrics. For example, the AP may determine whether the cluster is oversubscribed. If not, the method 400 returns to block 415 to continue monitoring the cluster.

If, at block 420, the AP determines that the cluster is oversubscribed, the method 400 continues to block 425, where the AP optionally expands the spectrum hole (e.g., by allocating one or more additional channels to the cluster). The method 400 then returns to block 415 to continue monitoring the cluster.

In this way, the AP can allocate resources for clusters of peer-to-peer devices based on a variety of metrics, thereby enabling improved peer-to-peer communication, reducing interference with the WLAN, and reducing the computational burden on the AP itself (e.g., by refraining from actively managing the peer-to-peer communications themselves).

Figure 5:
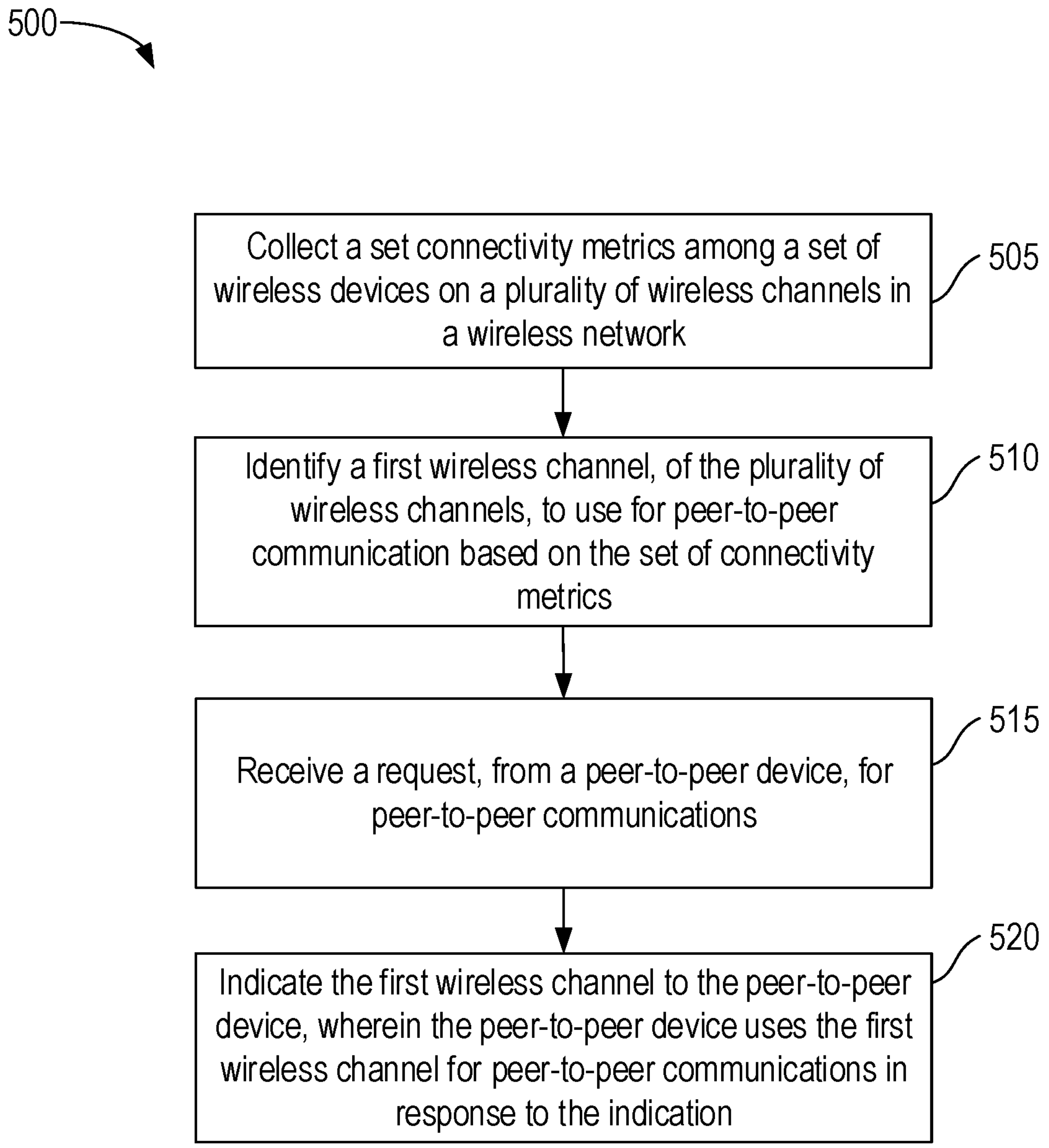
FIG. 5 is a flow diagram depicting an example method for peer-to-peer resource allocation, according to some embodiments of the present disclosure.

FIG. 5 is a flow diagram depicting an example method 500 for peer-to-peer resource allocation, according to some embodiments of the present disclosure. In some aspects, the method 500 is performed by a component of a WLAN, such as an AP (e.g., AP 110 of FIG. 1), a wireless controller (e.g., a WLC), and the like.

At block 505, a set connectivity metrics among a set of wireless devices on a plurality of wireless channels in a wireless network is collected.

At block 510, a first wireless channel, of the plurality of wireless channels, identified to use for peer-to-peer communication based on the set of connectivity metrics.

At block 515, a request is received, from a peer-to-peer device, for peer-to-peer communications.

At block 520, the first wireless channel is indicated to the peer-to-peer device, wherein the peer-to-peer device uses the first wireless channel for peer-to-peer communications in response to the indication.

Figure 6:
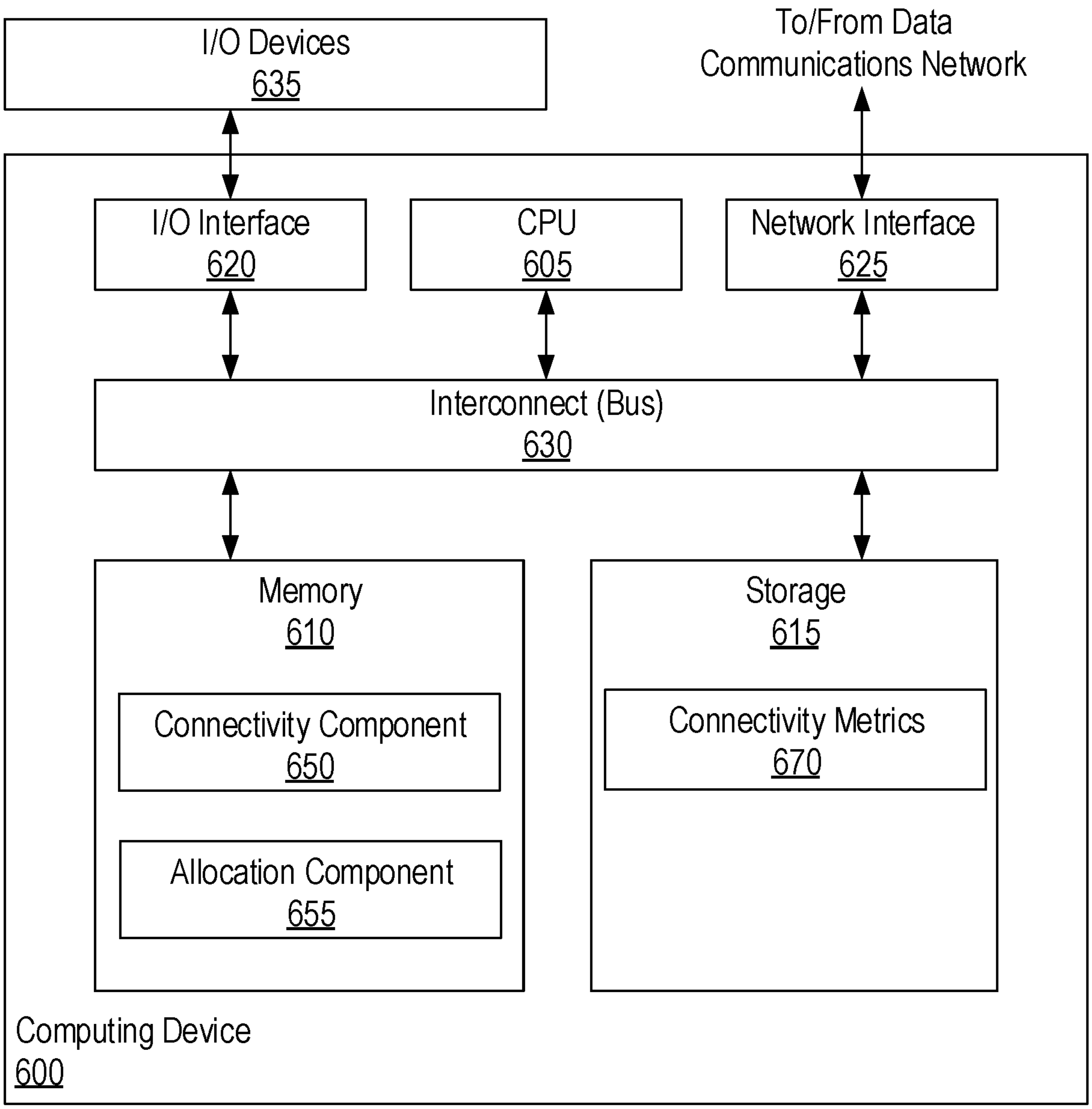
FIG. 6 depicts an example computing device configured to perform various aspects of the present disclosure, according to some embodiments of the present disclosure.

FIG. 6 depicts an example computing device 600 configured to perform various aspects of the present disclosure, according to some embodiments of the present disclosure. Although depicted as a physical device, in embodiments, the computing device 600 may be implemented using virtual device(s), and/or across a number of devices (e.g., in a cloud environment). In one embodiment, the computing device 600 corresponds to a WLAN component, such as an AP (e.g., AP 110 of FIG. 1).

As illustrated, the computing device 600 includes a CPU 605, memory 610, storage 615, a network interface 625, and one or more I/O interfaces 620. In the illustrated embodiment, the CPU 605 retrieves and executes programming instructions stored in memory 610, as well as stores and retrieves application data residing in storage 615. The CPU 605 is generally representative of a single CPU and/or GPU, multiple CPUs and/or GPUs, a single CPU and/or GPU having multiple processing cores, and the like. The memory 610 is generally included to be representative of a random access memory. Storage 615 may be any combination of disk drives, flash-based storage devices, and the like, and may include fixed and/or removable storage devices, such as fixed disk drives, removable memory cards, caches, optical storage, network attached storage (NAS), or storage area networks (SAN).

In some embodiments, I/O devices 635 (such as keyboards, monitors, etc.) are connected via the I/O interface(s) 620. Further, via the network interface 625, the computing device 600 can be communicatively coupled with one or more other devices and components (e.g., via a network, which may include the Internet, local network(s), and the like). As illustrated, the CPU 605, memory 610, storage 615, network interface(s) 625, and I/O interface(s) 620 are communicatively coupled by one or more buses 630.

In the illustrated embodiment, the memory 610 includes a connectivity component 650 and an allocation component 655, which may perform one or more embodiments discussed above. Although depicted as discrete components for conceptual clarity, in embodiments, the operations of the depicted components (and others not illustrated) may be combined or distributed across any number of components. Further, although depicted as software residing in memory 610, in embodiments, the operations of the depicted components (and others not illustrated) may be implemented using hardware, software, or a combination of hardware and software.

In one embodiment, the connectivity component 650 may be used to collect and/or evaluate connectivity metrics for one or more portions of an RF spectrum, as discussed above. For example, the connectivity component 650 may determine and/or evaluate the RSSI, noise, interference, utilization, and the like at each channel. The connectivity component 650 may do so by scanning each channel, evaluating beacon reports, and the like.

The allocation component 655 may be used to select and/or allocate portions of the spectrum (e.g., channels) based on the collected metrics, as discussed above. For example, the allocation component 655 may identify channel(s) with metrics that satisfy peer-to-peer criteria and/or do not satisfy AP criteria.

In the illustrated example, the storage 615 includes connectivity metric(s) 670. In some embodiments, the connectivity metric(s) 670 generally indicate the current and/or historical metrics for one or more channels in the spectrum. Although depicted as residing in storage 615, the connectivity metrics 670 may be stored in any suitable location, including memory 610.

In the current disclosure, reference is made to various embodiments. However, the scope of the present disclosure is not limited to specific described embodiments. Instead, any combination of the described features and elements, whether related to different embodiments or not, is contemplated to implement and practice contemplated embodiments. Additionally, when elements of the embodiments are described in the form of "at least one of A and B," or "at least one of A or B," it will be understood that embodiments including element A exclusively, including element B exclusively, and including element A and B are each contemplated. Furthermore, although some embodiments disclosed herein may achieve advantages over other possible solutions or over the prior art, whether or not a particular advantage is achieved by a given embodiment is not limiting of the scope of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, the embodiments disclosed herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatuses (systems), and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations and/or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations and/or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations and/or block diagrams.

The flowchart illustrations and block diagrams in the Figures illustrate the architecture, functionality, and operation of possible implementations of systems, methods, and computer program products according to various embodiments. In this regard, each block in the flowchart illustrations or block diagrams may represent a module, segment, or portion of code, which comprises one or more executable instructions for implementing the specified logical function (s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

In view of the foregoing, the scope of the present disclosure is determined by the claims that follow.

We claim:

1. A method, comprising:

collecting a set connectivity metrics for at least a first wireless channel of a plurality of wireless channels in a wireless network;

selecting, by a wireless access point (AP), a second wireless channel, of the plurality of wireless channels, to delegate for peer-to-peer devices to use for peer-to-peer communication based on the set of connectivity metrics, comprising using one or more frequency offset adjustment operations to predict connectivity metrics for the second wireless channel based on the set of connectivity metrics for the first wireless channel;

receiving a request, by the wireless AP and from a first peer-to-peer device, for peer-to-peer communications; and indicating, by the wireless AP, the second wireless channel to the first peer-to-peer device.

2. The method of claim 1, wherein collecting the set of connectivity metrics comprises scanning, by the wireless AP, each of the plurality of wireless channels.

3. The method of claim 1, wherein collecting the set of connectivity metrics comprises receiving, from one or more client devices, one or more beacon reports.

4. The method of claim 1, wherein selecting the second wireless channel comprises determining that the second wireless channel is currently unused by one or more wireless APs in the wireless network.

5. The method of claim 1, wherein the first peer-to-peer device uses the second wireless channel to schedule peer-to-peer communications with a second peer-to-peer device in response to the indication.

6. The method of claim 1, wherein selecting the first second wireless channel comprises determining, by the wireless AP, to refrain from using the second wireless channel.

7. The method of claim 6, further comprising:

collecting connectivity information for a cluster of peer-to-peer devices using the second wireless channel; and selecting a third wireless channel, of the plurality of wireless channels, in response determining, based on the connectivity information for the cluster of peer-to-peer devices, that the second wireless channel is over-subscribed.

8. The method of claim 1, further comprising:

receiving, from the first peer-to-peer device, a request to use the second wireless channel for peer-to-peer communications; and refraining, by the wireless AP, from using the second wireless channel for at least a period of time.

9. The method of claim 8, wherein the period of time is indicated in the request.

10. A non-transitory computer-readable medium containing computer program code that, when executed by operation of one or more computer processors, performs an operation comprising:

collecting a set connectivity metrics for at least a first wireless channel of a plurality of wireless channels in a wireless network;

selecting, by a wireless access point (AP), a second wireless channel, of the plurality of wireless channels, to delegate for peer-to-peer devices to use for peer-to-peer communication based on the set of connectivity metrics, comprising using one or more frequency offset adjustment operations to predict connectivity metrics for the second wireless channel based on the set of connectivity metrics for the first wireless channel;

receiving a request, by the wireless AP and from a first peer-to-peer device, for peer-to-peer communications; and indicating, by the wireless AP, the second wireless channel to the first peer-to-peer device, comprising delegating scheduling of peer-to-peer transmissions to the first peer-to-peer device.

11. The non-transitory computer-readable medium of claim 10, wherein collecting the set of connectivity metrics comprises scanning, by the wireless AP, each of the plurality of wireless channels.

12. The non-transitory computer-readable medium of claim 10, wherein the first peer-to-peer device uses the second wireless channel to schedule peer-to-peer communications with a second peer-to-peer device in response to the indication.

13. The non-transitory computer-readable medium of claim 10, wherein selecting the second wireless channel comprises determining, by the wireless AP, to refrain from using the second wireless channel.

14. The non-transitory computer-readable medium of claim 13, the operation further comprising:

collecting connectivity information for a cluster of peer-to-peer devices using the second wireless channel; and selecting a second wireless channel, of the plurality of wireless channels, in response determining, based on the connectivity information for the cluster of peer-to-peer devices, that the second wireless channel is over-subscribed.

15. The non-transitory computer-readable medium of claim 10, the operation further comprising:

receiving, from the first peer-to-peer device, a request to use the second wireless channel for peer-to-peer communications; and refraining, by the wireless AP, from using the second wireless channel for at least a period of time.

16. A system, comprising:

one or more computer processors; and a memory containing a program which when executed by the one or more computer processors performs an operation, the operation comprising:

collecting a set connectivity metrics for at least a first wireless channel of a plurality of wireless channels in a wireless network;

selecting, by a wireless access point (AP), a second wireless channel, of the plurality of wireless channels, to delegate for peer-to-peer devices to use for peer-to-peer communication based on the set of connectivity metrics, comprising using one or more frequency offset adjustment operations to predict connectivity metrics for the second wireless channel based on the set of connectivity metrics for the first wireless channel;

receiving a request, by the wireless AP and from a first peer-to-peer device, for peer-to-peer communications; and indicating, by the wireless AP, the second wireless channel to the first peer-to-peer device.

17. The system of claim 16, wherein collecting the set of connectivity metrics comprises scanning, by the wireless AP, each of the plurality of wireless channels.

18. The system of claim 16, wherein the first peer-to-peer device uses the second wireless channel to schedule peer-to-peer communications with a second peer-to-peer device in response to the indication.

19. The system of claim 16, wherein selecting the second wireless channel comprises determining, by the wireless AP, to refrain from using the second wireless channel, the operation further comprising:

collecting connectivity information for a cluster of peer-to-peer devices using the second wireless channel; and selecting a second wireless channel, of the plurality of wireless channels, in response determining, based on the connectivity information for the cluster of peer-to-peer devices, that the second wireless channel is over-subscribed.

20. The system of claim 16, the operation further comprising:

receiving, from the first peer-to-peer device, a request to use the second wireless channel for peer-to-peer communications; and refraining, by the wireless AP, from using the second wireless channel for at least a period of time.

* * * * *